(12) United States Patent
Roberts et al.

(10) Patent No.: US 6,691,925 B2
(45) Date of Patent: Feb. 17, 2004

(54) HEATER/DEFROSTER FOR AN AUTOMOBILE

(75) Inventors: Ronald C. Roberts, Orchard Lake, MI (US); Christopher H. Craft, Shelby Township, MI (US); Vinod Nanda, Rochester Hills, MI (US); Jeffrey J. Buschur, Lake Orion, MI (US); Richard S. Leemhuis, Rochester Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/097,289

(22) Filed: Mar. 14, 2002

(65) Prior Publication Data

US 2003/0173412 A1 Sep. 18, 2003

(51) Int. Cl.⁷ .................................................. B60H 1/02
(52) U.S. Cl. .................................. 237/12.3 R; 122/26
(58) Field of Search ....................... 237/12.3 B, 12.3 R; 126/247; 122/26

(56) References Cited

U.S. PATENT DOCUMENTS

| | | | | | |
|---|---|---|---|---|---|
| 4,393,824 | A | * | 7/1983 | Fischer et al. | 123/196 AB |
| 4,532,893 | A | * | 8/1985 | Day et al. | 133/41.31 |
| 4,728,029 | A | * | 3/1988 | Griebel et al. | 237/12.3 R |
| 5,031,690 | A | * | 7/1991 | Anderson et al. | 165/43 |
| 5,085,269 | A | * | 2/1992 | Aoki | 165/43 |
| 5,954,266 | A | * | 9/1999 | Hoshino et al. | 237/12.3 R |
| 6,126,082 | A | * | 10/2000 | Doyle | 237/12.3 R |

* cited by examiner

Primary Examiner—Derek Boles
(74) Attorney, Agent, or Firm—Jacox, Meckstroth & Jenkins

(57) ABSTRACT

Apparatus and Method for accelerating the warm-up of a heater/defroster in a passenger compartment of an automotive vehicle. A working fluid, such as power steering oil is rapidly heated by pumping it through a small orifice. An oil-to-coolant heat exchanger transfers heat from the working fluid to a liquid coolant. A blower generates an air stream and directs it across heat exchange surfaces of a coolant-to-air heat exchanger. Meanwhile the heated coolant is circulating through the interior of the coolant-to-air heat exchanger. This transfers heat from the liquid coolant and warms the air stream.

15 Claims, 4 Drawing Sheets

HEATER/DEFROSTER FOR AN AUTOMOBILE

BACKGROUND OF THE INVENTION

This invention relates to heating systems for automotive passenger vehicles. A principal object is to speed up the delivery of heat to the heater and the windshield defroster on a cold day. Commonly used prior art automobile heating systems rely upon heat generated in the engine. This heat is transferred to a liquid coolant which is routed through a heater core located in the passenger compartment.

During normal operation of the vehicle the coolant is directed through a connected series of internal engine passages. These passages are connected to a radiator which cools the engine by transferring excess heat from the coolant to the outside environment. When the engine is started from an initially cold condition, it passes through an engine warm-up phase during which the coolant bypasses the radiator. This conserves energy and speeds up the onset of smooth, normal operation.

On a cold day the engine warm-up phase continues for about 15 minutes, the coolant is insufficiently hot for warming the passengers or defrosting the windshield until after that period of time has elapsed. This is especially true for vehicles equipped with diesel engines. In the future, as engines become more efficient, smaller amounts of excess engine heat will be generated. This then will further prolong the engine warm-up time.

Several methods are currently employed for decreasing vehicle warm-up time. One such method involves using an electric heater in line with the pre-existing heat exchanger. This arrangement decreases vehicle warm-up time, but it requires a substantial increase in electrical power supplied by the alternator. As a practical matter, the surplus electrical power available for servicing such a heating system is limited to about 1.0 kw. Other known methods for increasing heat to the passenger compartment include gas fired heaters, viscous shearing devices, and electric seats.

SUMMARY OF THE INVENTION

This invention speeds up the operation of an automotive heating system by providing a novel local heat generator in the form of an orifice of appropriate size. A working fluid, preferably an oil such as power steering fluid, is heated by pumping it through the orifice at an appropriate mass flow rate. A 5–10 KW hydraulic pump is considered to be suitable for this purpose. The invention may be practiced through the use a dedicated pump, but a shared pump also could be used. A suitable shared pump could provide pressurized hydraulic fluid flow for other functions such as power steering, braking or radiator fan operation. Heat energy, delivered to the working fluid during passage through the orifice, is transferred to an airstream flowing through the passenger compartment, thereby warming the occupants and defrosting the windows.

In a first embodiment of the invention the working fluid is a hydraulic fluid, which flows through an oil-to-coolant heat exchanger, following passage through the orifice. As the working fluid passes through the oil-to-coolant heat exchanger, it heats a liquid coolant which is passing concomitantly therethrough. The liquid coolant flows through a coolant-to-air heat exchanger situated in the passenger compartment. A blower fan then heats the passenger compartment by blowing ambient air across heat transfer surfaces in the coolant-to-air heat exchanger. Meanwhile the engine is being separately heated by another flow of liquid coolant flowing in a loop which has a direct return to the engine.

Further, in the first embodiment there is a thermostatic valve which directs the return flow of liquid coolant through a radiator when the engine has been heated to a suitably high operating temperature. There is also a bypass valve for isolating and circulating a fraction of the liquid coolant, independently of the main engine coolant circuit. This reduces the thermal mass of the liquid coolant used for heating the passenger compartment, thereby increasing the speed of warm-up.

A second embodiment of the invention also uses hydraulic oil as a working fluid. However, two heat exchangers are mounted in the passenger compartment; one of which exchanges heat from oil to air; and the other of which exchanges heat from coolant to air. There is no heat exchange from oil to coolant. The two heat exchangers are positioned in tandem, so that air can be blown in sequence over the two sets of heat exchange surfaces.

In a third embodiment of the invention an oil-to-air heat exchanger and a coolant-to-air heat exchanger are placed side-by-side. Air flow is provided by single blower and suitable ductwork.

DESCRIPTION OF THE PREFERRED EMBODIMENT

Figure 1:
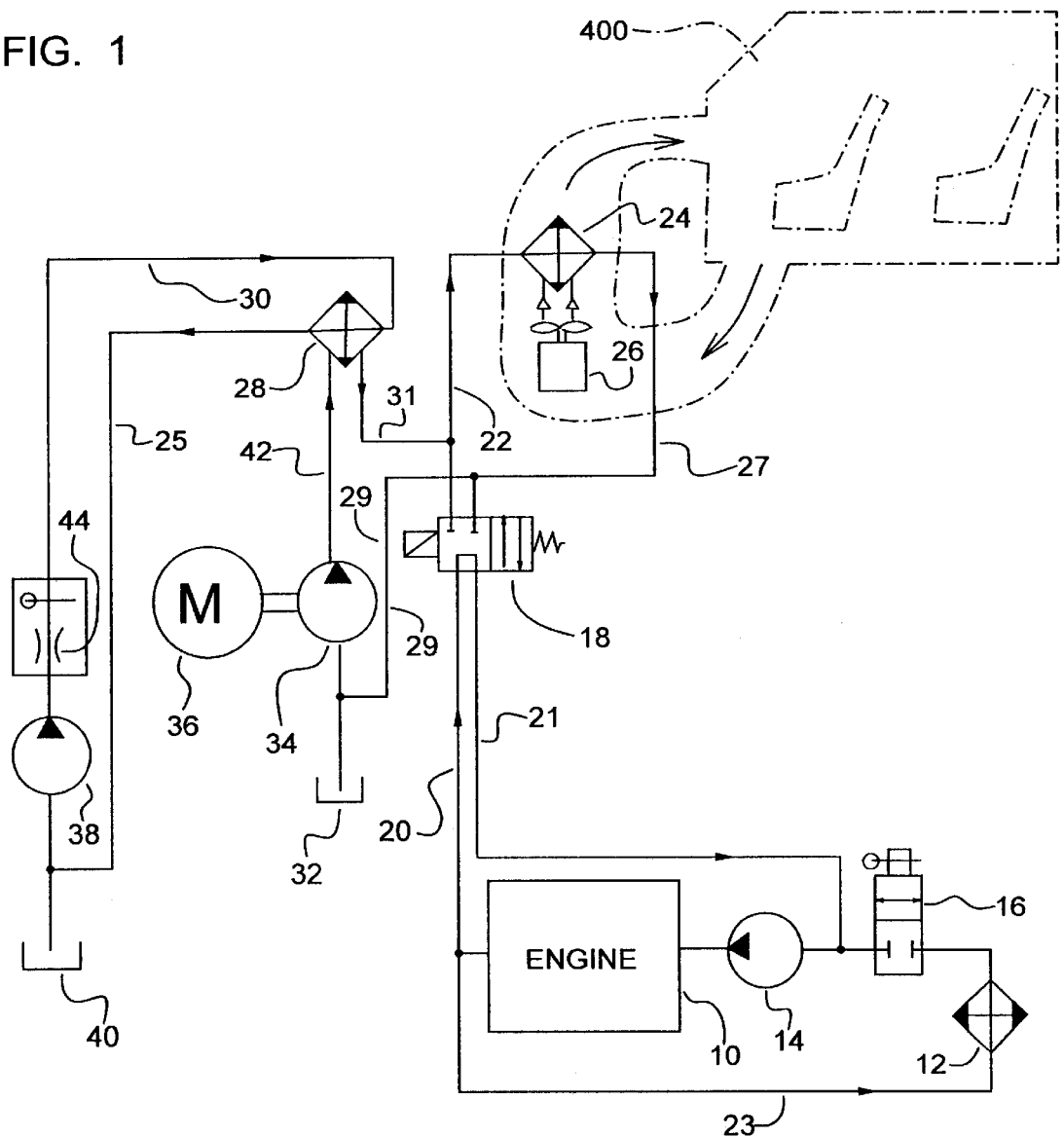
FIG. 1 is a sketch of an automobile heater/defroster according to a first embodiment of the invention.

FIG. 1 illustrates a preferred embodiment of the invention, able to warm up output air from an automobile heater to a temperature of about 140 degrees Fahrenheit in about 3 minutes, based upon actual performance measurements. The illustrated embodiment operates in association with an internal combustion engine 10 cooled by a liquid coolant flowing through a series of internal passages (not illustrated) within the engine. A 50/50 mixture of ethylene glycol antifreeze and low mineral content water will function satisfactorily as a coolant. During operation at normal temperatures, the coolant flows from engine 10, via a radiator supply line 23, to a radiator 12 where excess engine combustion heat is absorbed and radiated to the atmosphere. A primary water pump 14 maintains coolant flow through radiator 12 to engine 10, so long as the coolant temperature remains above some predetermined minimum. This provides engine cooling, as required.

A thermostatic valve 16, connected as illustrated in FIG. 1, prevents coolant flow through radiator 12 so long as the temperature thereof is below the predetermined minimum. A temperature sensor (not illustrated) causes thermostatic valve 16 to be switched to an alternative position (connections for which may be understood by reference to FIG. 1), after the cooling liquid has reached the predetermined minimum temperature. Thermostatic valve 16 operates in a manner known in the prior art to reduce engine warmup time by preventing early heat loss through radiator 12.

The embodiment of FIG. 1 has a bypass valve 18 which can be switched selectively between a first position and a second position, both of which may be understood by referring to the figure. In the condition illustrated in FIG. 1 bypass valve 18 is in the first position in which the coolant flowing through engine 10 is isolated from other coolant flowing through a passenger compartment 400 (illustrated by phantom lines) via a coolant-to-air heat exchanger 24. In the second position coolant flow leaving engine 10 travels through valve 18 and heat exchanger 24 in which case heat from engine is transferred to passenger compartment 400 as is typical in present art. It will be understood that bypass valve 18 divides coolant between an Engine Loop and a Passenger Compartment Loop maintaining a relatively much smaller volume in the Passenger Compartment Loop. This reduces the thermal mass of the liquid coolant used for heating the passenger compartment, thereby increasing the speed of warm-up.

Heat exchanger 24 comprises a conventional heater core, provided with heat exchange surfaces (not illustrated) which remove heat from the coolant flowing within distribution line 22 and transfer it to a stream of air generated by a blower 26.

A secondary water pump 34, powered by a motor 36, withdraws coolant from a coolant storage vessel 32 and directs it via a second coolant supply line 42 to an oil-to-coolant heat exchanger 28. Coolant returns from oil-to-coolant heat exchanger 28 to secondary water pump 34 via second coolant distribution line 31, first coolant distribution line 22, coolant-to-air heat exchanger 24, a second coolant return line 27 and a third coolant return line 29.

While secondary water pump 34 is supplying coolant to oil-to-coolant heat exchanger 28, an oil pump 38 is withdrawing oil from an oil storage vessel 40 and supplying it to oil-to-coolant heat exchanger 28 via an orifice 44 and an oil distribution line 30. Preferably, oil pump 38 is of sufficient size to provide 5–10 KW of hydraulic energy at vehicle idle conditions.

The task of oil-to-coolant heat exchanger 28 is to rapidly heat coolant being supplied to coolant-to-air heat exchanger 24 during the period of time while engine 10 is warming up from a cold start. Heat exchanger 28 performs this task by withdrawing heat from oil flowing through oil distribution line 30 and transferring it into the flowing liquid coolant being pumped into line 42 by secondary water pump 34. Preferably oil-to-coolant heat exchanger 28 has a heat transfer capability of about 40 BTU/min-degrees Fahrenheit, and coolant-to-air heat exchanger 24 has a heat transfer capability of about 24 BTU/min-degrees Fahrenheit. These heat transfer capabilities may be achieved by appropriate selection of heat transfer coefficients and surface areas for the heat exchangers, as is well known in the art. A blower rating of 150 cfm is satisfactory.

The oil provided by oil distribution line 30 may be power steering oil, commercially available as Mopar MS-5391 or its equivalent. This oil is heated by resistance to flow through orifice 44. Flow parameters may be selected so as to provide a heating performance of particular interest. By way of example, orifice 44 may have a diameter of about 0.1 inch and may throttle oil flowing therethrough at a rate of about 10 gpm. This provides a pressure drop of approximately 2000 psi and generates heat at a rate of about 500 Btu/min. A suitable oil pump 38 may be either a vane-type or a gear-type, having a displacement of 4.2 cubic inches and a volumetric efficiency of 85%. Of course, the pump must have sufficient structural integrity for handling a head of 2000 psi.

Figure 4:
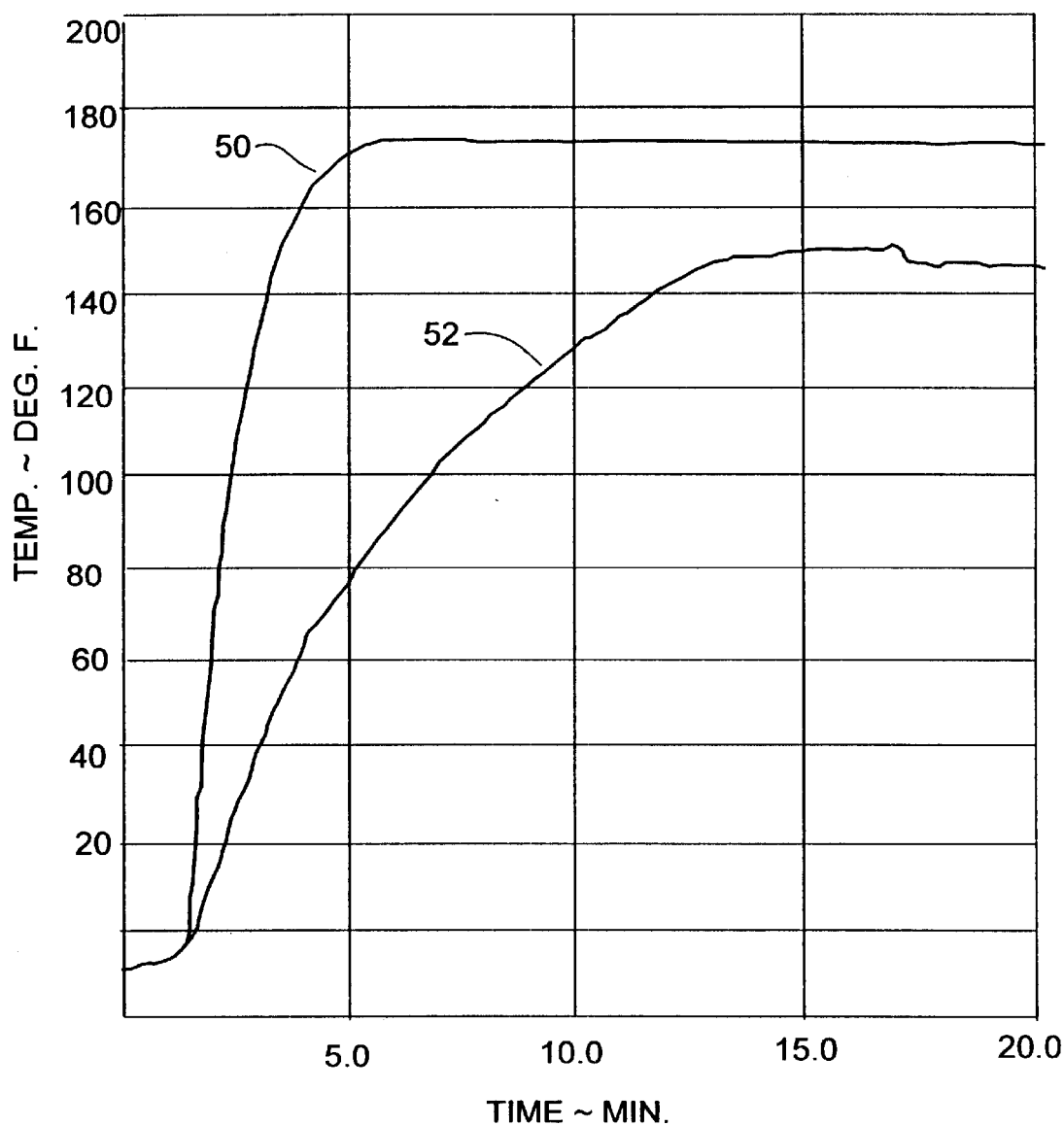
FIG. 4 is a plot comparing the warm-up time for the present invention with the warm-up time for a typical prior art automobile heater/defroster.

A heater/defroster configured as above described will heat the oil flowing through oil distribution line 30 to a temperature of 150 degrees Fahrenheit in approximately one minute. The air blowing past the heat exchange surfaces of coolant-to-air heat exchanger 24 will rise to a temperature of 150 degrees Fahrenheit in approximately 2 to 3 minutes. FIG. 4 compares the computed performance of such a heater/defroster with test results for a typical prior art system not equipped with temperature boosting means according to this invention. As shown therein by curve 50, the temperature of the heated air provided by this invention rises rapidly to about 170 degrees Fahrenheit in about 5 minutes and then levels off. Curve 52 presents a corresponding plot of temperature vs. time for a typical prior art system. This latter curve climbs much more slowly to a maximum temperature of about 150 degrees Fahrenheit in about 15 minutes. Clearly the invention provides a substantial increase in passenger comfort on cold days, along with much faster windshield defrosting. A secondary benefit is a reduction in engine and transmission warm-up times. This system could be disabled during normal operation to minimize energy consumption, or could be disabled during times when quick acceleration is desired.

Figure 2:
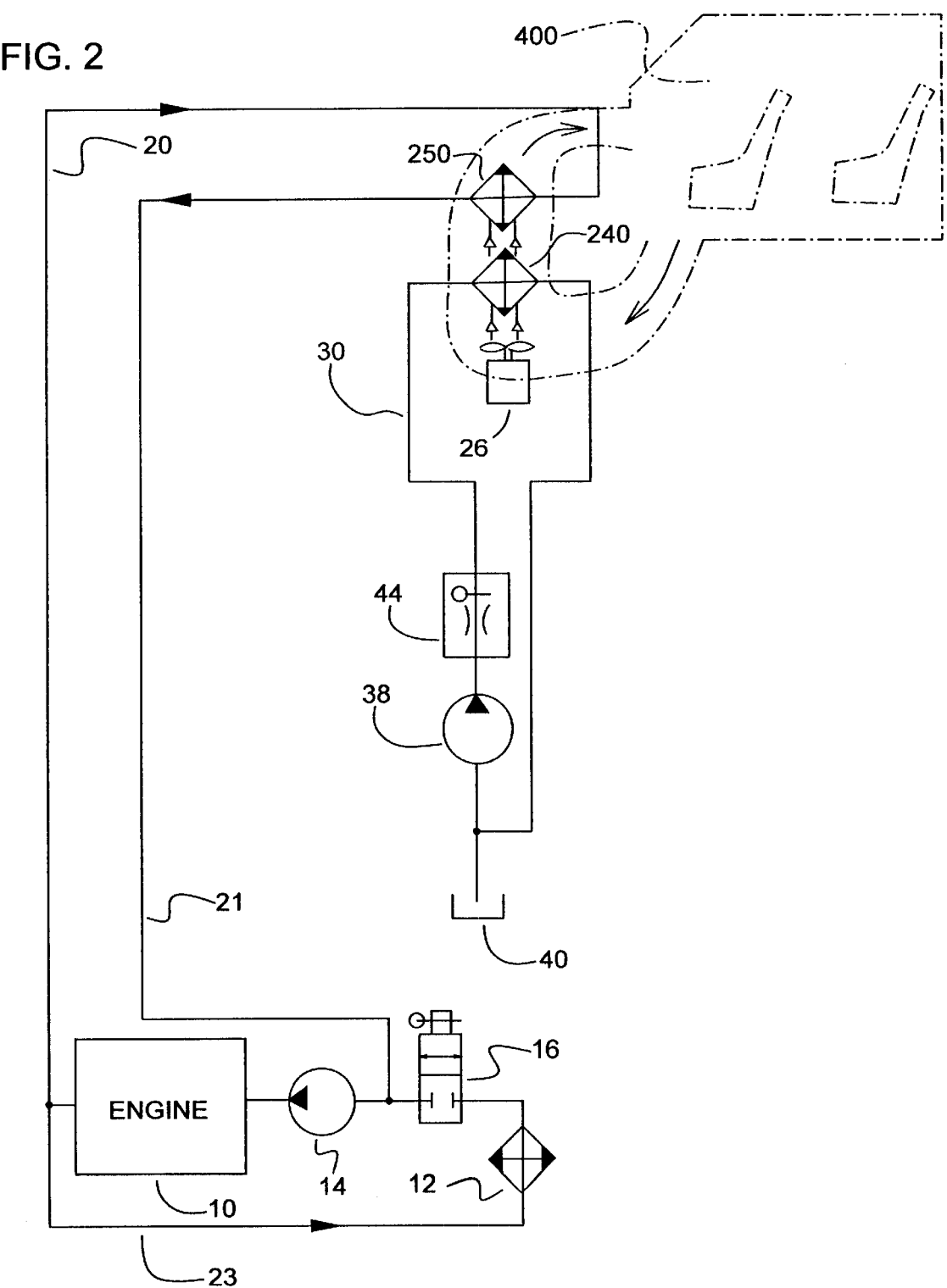
FIG. 2 is a sketch of an automobile heater/defroster according to a second embodiment of the invention.

FIG. 2 illustrates a second embodiment of the invention. For ease of understanding, elements of FIG. 2 have like reference numerals as corresponding elements in FIG. 1. The alternative embodiment of FIG. 2 differs from the embodiment of FIG. 1 in its elimination of bypass valve 18 and secondary water pump 34. Also, blower 26 warms the passenger compartment by blowing air over an oil-to-air heat exchanger 240 placed in front of a coolant-to-air heat exchanger 250. Oil pump 38 and orifice 44 provide a supply of quickly heated oil for use in a fast warm-up of the air stream generated by blower 26. Thereafter the heat required for warming the above-mentioned air stream is supplied by engine 10. As mentioned above in connection with the embodiment of FIG. 1, primary water pump 14 pumps liquid coolant through engine 10 and into coolant supply line 20. Following warm-up, thermostatic valve 16 opens to permit coolant flow through radiator 12. Heat exchanger 250 is substantially similar to a prior art heater core. This embodiment could be implemented using a 2-part heater core, with oil passing through one half, and coolant through the other half.

Figure 3:
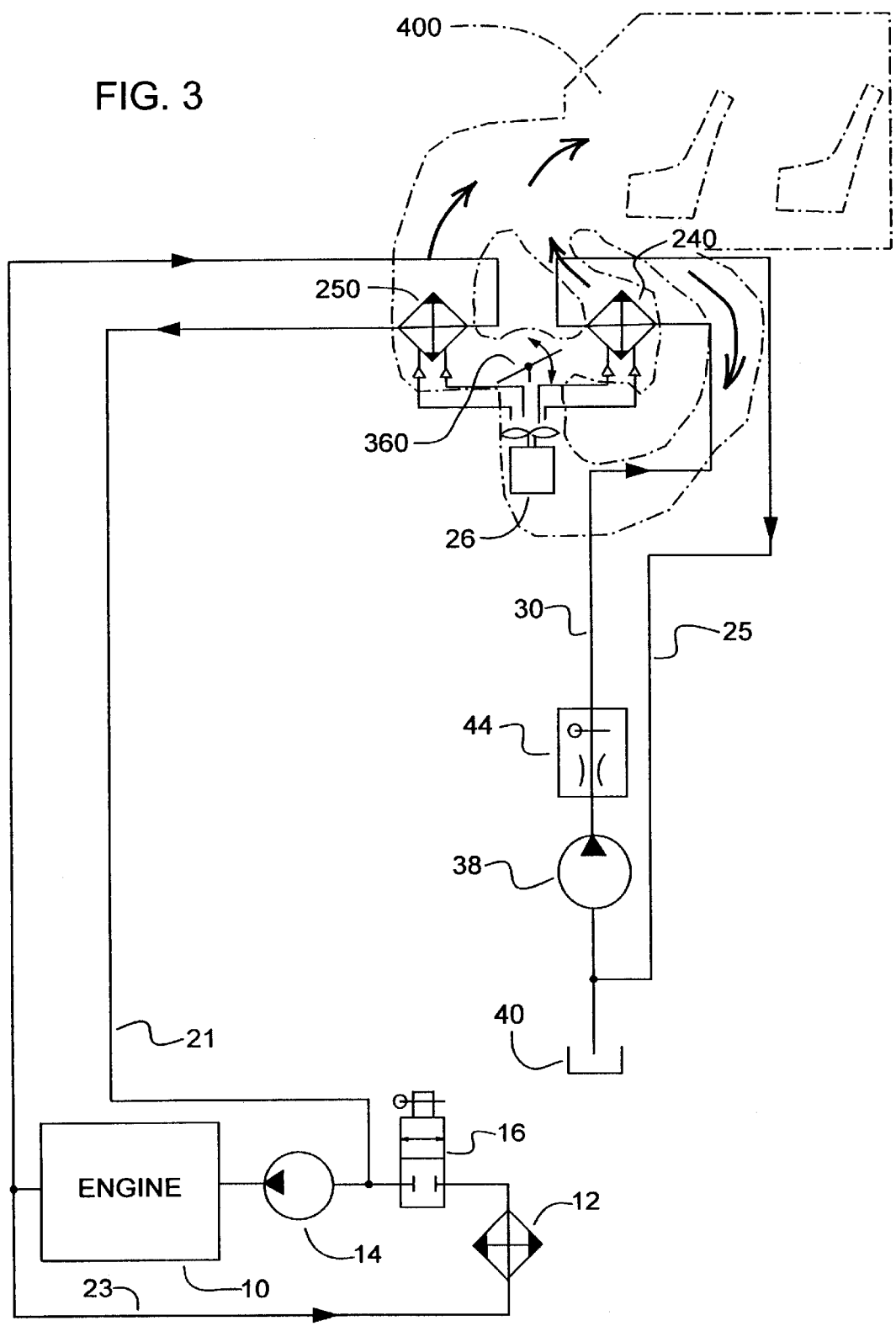
FIG. 3 is a sketch of an automobile heater/defroster according to a third embodiment of the invention.

FIG. 3 illustrates a second alternative embodiment which is substantially similar to the first alternative embodiment of FIG. 2. The primary difference is that the heat exchangers 240, 250 are arranged side-by-side rather than in tandem. This requires a damper door 360 and suitable ductwork, as generally illustrated in the figure.

What is claimed is:

1. In an automotive vehicle comprising a passenger compartment, a coolant-to-air heat exchanger, a blower for causing a stream of air to flow against said coolant-to-air heat exchanger and into said passenger compartment, and a liquid coolant supply circuit for causing a heated stream of liquid coolant to heat said stream of air by flowing through said coolant-to-air heat exchanger in thermal contact therewith; the improvement wherein said liquid coolant supply circuit comprises an orifice, a pump, a pump for heating hydraulic oil by forcibly pumping said hydraulic oil through said orifice, against a fluid resistance associated therewith; an oil-to-coolant heat exchanger for transferring heat from said hydraulic oil to said liquid coolant; said coolant-to-air heat exchanger receiving said heated hydraulic oil such that when said blower causes a stream of air to flow against said coolant-to-air heat exchanger, said passenger component becomes heated.

2. The improvement of claim 1 wherein said liquid coolant supply means comprises a first coolant supply for supplying liquid coolant to an engine of said automotive vehicle, and a second coolant supply for supplying liquid coolant to said passenger compartment, and a bypass valve for apportioning said liquid coolant between said first coolant supply and said second coolant supply.

3. In an automotive vehicle comprising a passenger compartment, a coolant-to-air heat exchanger, a blower for causing a stream of air to flow against said coolant-to-air heat exchanger and into said passenger compartment, and liquid coolant supply means for causing a heated stream of liquid coolant to heat said stream of air by flowing through said coolant-to-air heat exchanger in thermal contact therewith; the improvement wherein said liquid coolant supply means comprises means defining an orifice, means for directing a flow of hydraulic oil toward said orifice, a pump for heating said hydraulic oil by forcibly pumping it through said orifice, against a fluid resistance associated therewith, and an oil-to-coolant heat exchanger for transferring heat from said hydraulic oil to said liquid coolant;

wherein said liquid coolant supply means comprises first coolant supply means, connected for supplying liquid coolant to an engine of said automotive vehicle, second coolant supply means connected for supplying liquid coolant to said passenger compartment, and a bypass valve for apportioning said liquid coolant between said first coolant supply means and said second coolant supply means; and wherein said first coolant supply means is and has capacity for maintaining a relatively much larger fluid volume than said second coolant supply, so that said passenger compartment may by warmed up relatively quickly and independently of said engine.

4. The improvement of claim 3 wherein said first coolant supply means comprises a radiator for removing heat from coolant flowing therethrough, a radiator supply line for conveying heated coolant from said engine to said radiator, means for returning cooled coolant from said radiator to said engine, and a thermostatic valve for preventing the flow of said heated coolant through said radiator before said engine has warmed up to a predetermined operating temperature.

5. In an automotive vehicle comprising an engine provided with internal passages for circulation of a liquid coolant, a first water pump for forcing a flow of said liquid coolant through said internal passages, a radiator for removal of heat from said liquid coolant, a passenger seating compartment, a heater core positioned in said passenger seating compartment, and a blower for maintaining a comfortable temperature by blowing air over said heater core; the improvement wherein said automotive vehicle further comprises a heat accelerator comprising an oil-to-coolant heat exchanger an oil supply vessel, connected for supplying said hydraulic oil to said oil-to-coolant heat exchanger and receiving a return flow therefrom, an orifice for locally restricting passage of said hydraulic oil between said oil supply vessel and said oil-to-coolant heat exchanger, an oil pump for heating said hydraulic oil by forcibly causing said hydraulic oil to flow through said orifice against resistive forces generated thereby, a coolant supply vessel, connected for supplying a said liquid coolant to said oil-to-coolant heat exchanger and receiving a return flow therefrom, so that heat is transferred from said hydraulic oil to said liquid coolant, in an oil-to-coolant heat exchanger and from said liquid coolant to said air.

6. The improvement of claim 5, said heating apparatus further comprising a second water pump for circulating said liquid coolant through said oil-to-coolant heat exchanger and through said heater core.

7. The improvement of claim 6 further comprising: a bypass valve, a coolant distribution line extending between said bypass valve and said coolant-to-air heat exchanger, a first coolant supply line, extending from said engine to said bypass valve, said bypass valve being positionable for selectively enabling passage of liquid coolant from said engine to said coolant-to-air heat exchanger.

8. Heating apparatus for a passenger compartment of an automotive vehicle comprising:

(a) an oil-to-air heat exchanger;

(b) an oil supply vessel, connected for supplying hydraulic oil to said oil-to-air heat exchanger and receiving a return flow therefrom;

(c) an orifice for locally restricting passage of said hydraulic oil between said oil supply vessel and said oil-to-air heat exchanger;

(d) a pump for heating said hydraulic oil by forcibly causing said hydraulic oil to flow through said orifice against resistive forces generated thereby;

(e) a coolant-to-air heat exchanger;

(f) an internal combustion engine;

(g) means for circulating a liquid coolant through said internal combustion engine, so that said internal combustion engine is cooled, and said liquid coolant is simultaneously heated;

(h) means for conveying said liquid coolant from said internal combustion engine to said coolant-to-air heat exchanger and returning said liquid coolant from said coolant-to-air heat exchanger to said internal combustion engine; and (i) means for blowing air into contact with both of said heat exchangers and thence causing said air to flow into said passenger compartment, so that said air is warmed by said heat exchangers and thereafter warms said passenger compartment.

9. Heating apparatus according to claim 8, wherein said heat exchangers are arranged in tandem.

10. Heating apparatus according to claim 8, wherein said heat exchangers are arranged side-by-side.

11. A method of warming a stream of air for use in an automobile, said method comprising the steps of:

(1) heating an hydraulic oil by pumping said oil at high pressure through an orifice;

(2) conveying said hydraulic oil from said orifice to an oil-to-coolant heat exchanger;

(3) conveying a liquid coolant to said oil-to-coolant heat exchanger in order to heat said liquid coolant;

(4) causing said oil-to-coolant heat exchanger to transfer heat from said hydraulic oil to said liquid coolant;

(5) conveying said liquid coolant from said oil-to-coolant heat exchanger to a coolant-to-air heat exchanger; and (6) directing said stream of air into contact with said coolant-to-air heat exchanger.

12. A passenger compartment heating system for heating a passenger compartment of an automobile, comprising:

a pump for pumping hydraulic fluid through an orifice dimensioned to heat the hydraulic fluid to provide heated hydraulic fluid;

a first heat exchanger for receiving said heated hydraulic fluid and for using said heated hydraulic fluid to heat a second fluid to provide a heated second fluid;

a second heat exchanger for receiving said heated second fluid; and a blower for blowing a stream of air across said second heat exchanger to provide a heated stream of air into said passenger compartment.

13. The passenger compartment heating system as recited in claim 12 wherein said hydraulic fluid is hydraulic oil and said second fluid is a liquid coolant.

14. The passenger compartment heating system as recited in claim 13 wherein said hydraulic oil is power steering oil.

15. The passenger compartment heating system as recited in claim 12 wherein said first heat exchanger is an oil-to-coolant heat exchanger and said second heat exchanger is a coolant-to-air heat exchanger situated downstream of said oil-to-coolant heat exchanger.

* * * * *